June 10, 1952 — F. F. STUBE — 2,600,030
ACTUATING MECHANISM FOR DIRECTION INDICATING
SIGNAL FOR MOTOR VEHICLES Filed Feb. 15, 1950 — 2 SHEETS—SHEET 1

INVENTOR.
Frederick F. Stube,
BY
Parker, Frohman & Farmer
Attorneys.

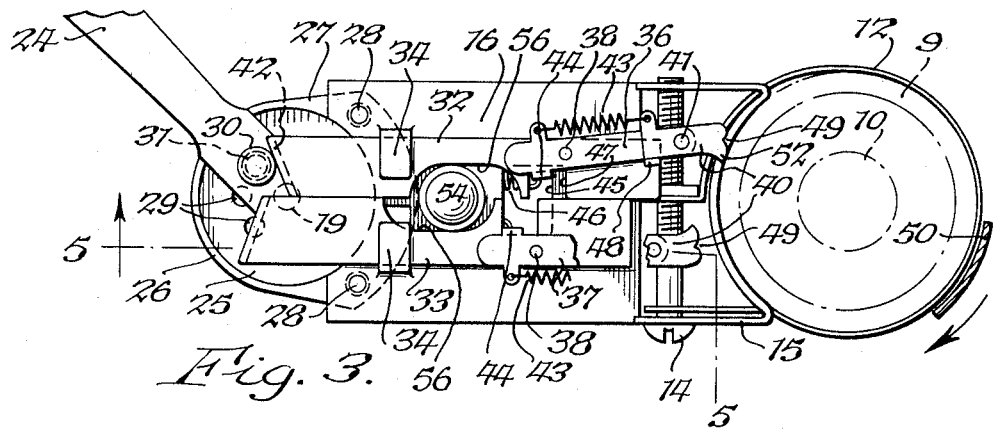

Patented June 10, 1952

2,600,030

UNITED STATES PATENT OFFICE 2,600,030

ACTUATING MECHANISM FOR DIRECTION INDICATING SIGNAL FOR MOTOR VEHICLES

Frederick F. Stube, Syracuse, N. Y., assignor to R. E. Dietz Company, Syracuse, N. Y.

Application February 15, 1950, Serial No. 144,247

13 Claims. (Cl. 200—59)

This invention relates to improvements in devices for actuating direction indicating signals for vehicles, and more particularly to devices of this type which are self-cancelling when a turn has been completed.

One of the objects of this invention is to provide an efficient and reliable signal actuating mechanism of this type which is positive in operation and which lends itself readily to quantity production.

Another object is to provide a mechanism of this type which may be used in connection with multiple-position switches of different types.

A further object is to provide a mechanism of this type which is so constructed that if for any reason the self-cancelling mechanism fails to operate, the device may be operated manually without the necessity of holding the movable switch member in contact position while the signal is being actuated.

It is also an object of this invention to provide a mechanism which is so constructed that if the manually actuated member is held against movement into signal cancelling position while the self-cancelling mechanism attempts to cancel the signal, no damage to any part of the signal actuating mechanism will result.

Other objects and advantages will be apparent from the following description of one embodiment of the invention and the novel features will be particularly pointed out hereinafter in connection with the appended claims.

In the accompanying drawings:

Figs. 3 and 4 are top plan views showing the parts in different positions which they occupy when different signals are being made.

Fig. 5 is a fragmentary, longitudinal, sectional elevation thereof, on line 5—5, Fig. 3.

Figure 2:
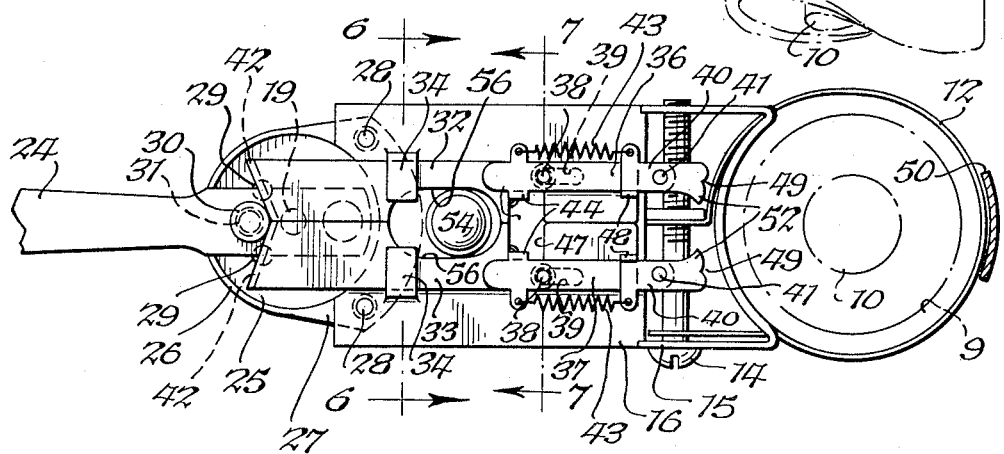
Fig. 2 is a top plan view of the signal actuating mechanism showing the parts in the positions which they occupy when no signal is made.

Figs. 6 and 7 are transverse, sectional elevations thereof respectively, on lines 6—6 and 7—7, Fig. 2.

Fig. 8 is a fragmentary top plan view thereof showing some of the parts in different positions.

Figure 1:
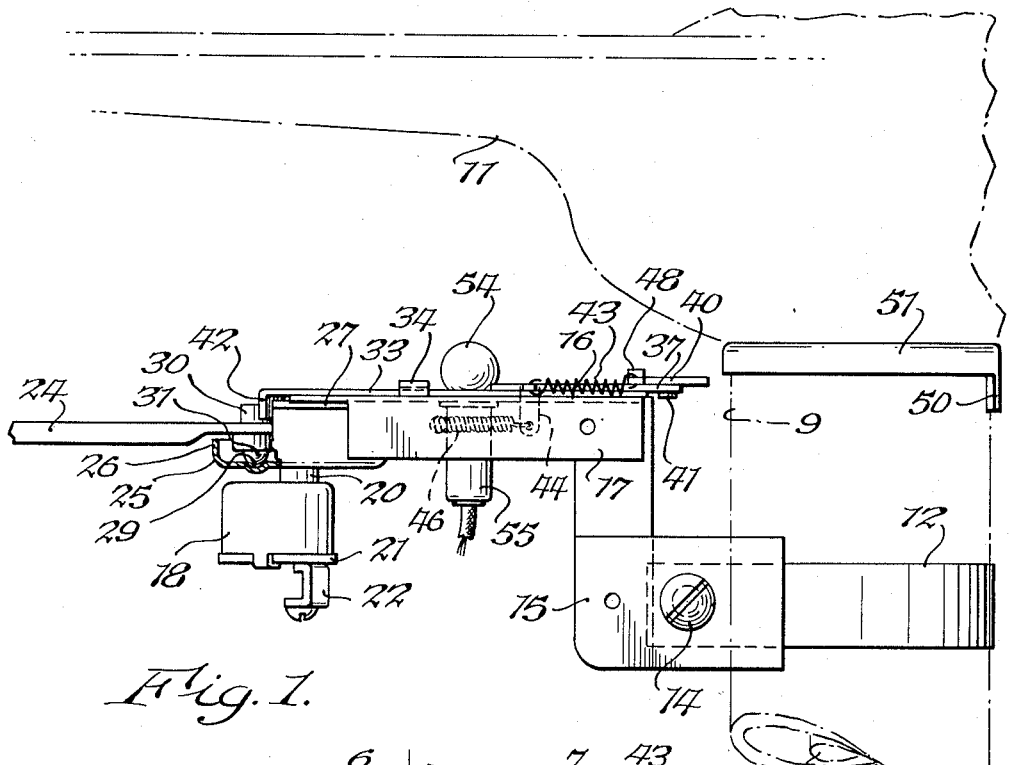
Fig. 1 is a fragmentary elevation of a steering column of a motor vehicle and showing in elevation and partly in section a signal actuating mechanism applied thereto and embodying this invention.

In Fig. 1, I have shown in broken lines the upper portion of a steering column 9 within which the usual shaft 10 is housed which may be turned by means of a steering wheel 11, partly shown in broken lines.

The signal actuating mechanism may be mounted on the steering column 9 in any suitable or desired manner, for example, by means of a clamping device including a clamping band 12 extending about the steering column adjacent the steering wheel and which may be held in gripping engagement with the column 9 by means of a clamping screw 14. A bracket 15 is suitably supported on the steering column by means of the clamping band and this bracket supports a base 16 on which the parts of the signal actuating mechanism are mounted. Any other suitable or desired means for mounting the signal actuating mechanism on the steering column of the vehicle may be employed if desired.

The base 16 in the particular construction shown is in the form of a plate having downwardly extending flanges 17 at opposite sides thereof to which the bracket 15 may be secured and having suitably secured thereto at the outer end thereof an electric, multiple position switch contained in a housing 18. This switch may be of any suitable or desired type. Since the construction of switches of this type is well known and since switches of this type are readily available, the interior of the switch housing is not shown. It will be understood, however, that the switch comprises a movable contact member mounted on a stem or shaft 19, shown in broken lines in Figs. 2, 3 and 4. This shaft 19 is pivoted to swing about its axis and extends through a hollow, tubular extension 20 of the switch housing 18. This movable contact member is shifted by the pivoted stem or shaft into positions to engage stationary contacts mounted on an insulating plate 21, Fig. 1, secured to the switch housing 18, the stationary contacts being connected with suitable terminals 22 mounted on the insulating plate 21, and to which conductors (not shown) leading to the source of power and to signal lights on other devices, are connected in the usual manner, one of these terminals being shown in Fig. 1. When the stem or shaft 19 is in an intermediate position, the movable contact operated by the stem or shaft will not engage the stationary contacts, so that no signal will be actuated. When the stem 19 is turned in one direction, it will contact one or more stationary terminals to complete a circuit, including a lamp or other signal device, to indicate that a turn in one direction is to be made, and when the stem or shaft 19 is turned in the other direction, another circuit containing a different signal device will be operated to indicate that a turn in the other direction is to be made. Switches of this type are commonly used in connection with hand operated devices for actuating and cancelling signals to indicate the direction in which the vehicle is about to turn.

The oscillatory shaft 19 of the switch may be provided with any suitable or desired handle for turning this stem or shaft. In the construction shown for this purpose, a handle 24 is provided which is rigidly connected with the pivoted stem or shaft 19 at the upper end thereof and which may be readily moved by the operator of the vehicle to place the movable switch member into either of its two contacting positions, as shown in Figs. 3 and 4, or into an intermediate position, shown in Fig. 2, in which both the signal circuits will be open.

Means are provided for yielding holding the switch operating handle 24 in any of its positions, and in the construction shown for this purpose, a detent member is provided which, in the particular construction shown by way of example, is in the form of a disk or plate 25 having an upwardly extending annular flange 26 and a laterally extending flange 27 which is suitably secured to the base 16, for example, by bolts, rivets or the like 28. The disk portion 25 of this detent member is provided with pressed-out portions or shallow cavities 29, and the handle 24 is provided with a spring-pressed plunger or ball contained in a thimble or guide cylinder 30, secured to the handle and extending upwardly therefrom and through an opening in the handle, so that the spring-pressed plunger or ball 31 may enter the cavities 29 in the disk portion of plate 25. The depressions or cavities 29 are so located that the spring-pressed plunger or ball will enter either of the two outer cavities when the movable switch member is in either of its circuit-closing positions and will enter the middle cavity when the switch is in open-circuit position. Consequently, if the operator of a vehicle wishes to make a turn, the handle is moved from the neutral or intermediate position, shown in Fig. 1, into either of the two positions shown in Figs. 3 and 4, and the handle will be yieldingly held in these positions until positively moved into the intermediate position.

Mechanism is provided for automatically moving the handle 24 into the intermediate or open-circuit position after a turn has been completed, to cancel any signal made by the manual movement of the handle, and the mechanism shown for this purpose includes a pair of arms 32 and 33 which are movably mounted on the base 16 in any suitable manner. In the particular construction illustrated by way of example, these arms are slidably mounted on the base 16 and suitable means are provided for guiding these arms in their movement. For this purpose the base may, for example, be provided with lips 34 struck out from the base and bent over the outer sides and upper surfaces of the arms 32 and 33. These arms, shown by way of example, are in the form of flat plates lying on the base and with their adjacent edges in contact with each other, and consequently the lips 34 hold the arms in positions in which their adjacent edges contact each other, and in which they are held in sliding contact with the base so that the arms may slide in the directions of their length on the base 16 independently of each other. Any other mounting for movably supporting the arms on the base may be provided.

The arms 32 and 33 have fingers 36 and 37 pivoted thereon, for example, by means of pivot pins 38. Preferably these pivot pins also serve as additional guides for the movement of the arms 33. For this purpose, slots 39 are provided in the base 16, see particularly Figs. 5 and 7, and the pivot pins 38 extend through the slots and have heads on the lower ends thereof engaging the lower surface of the base 16 to hold the arms and fingers in correct relation to the base. These slots 39 extend lengthwise of the base 16 and consequently guide the arms 32 and 33 for movement lengthwise of the base, in cooperation with the lips 34 and the contacting edges of the arms 32 and 33.

The pivoted fingers 36 and 37 are each made in two parts and include cams or extensions 40 which are pivoted at 41. When the handle 24 is in its intermediate position shown in Fig. 2, the outer ends of these cams of the fingers will be spaced in relation to the steering column 9 as shown in Fig. 2. Means, however, are provided which are actuated by the handle 24 for moving either arm to place the cam or extension 40 of the finger mounted on the arm into contact with the steering column. In the particular construction shown for this purpose, the arms are provided at the ends thereof adjacent the handle 24 with the inclined or bevelled ends, and preferably these ends of the arms are bent downwardly to form flanges 42 which are so positioned that they may be engaged by a part of the handle when the same is swung about the axis of the pivoted rod or shaft 19. In the construction shown for this purpose, the thimble or cylindrical projection 30 forming the housing of the spring-actuated detent is used for the purpose of moving one or the other of the arms 32, 33 by contacting with the down-turned flanges 42 of the arms. Consequently, if the handle 24 is turned in a clockwise direction into the position shown in Fig. 3, it will be noted that the arm 32 and the finger 36 mounted thereon are moved toward the steering column and in this projected position the cam 40 of the finger 36 will engage the steering column. When the handle 24 is swung in the opposite direction into the position shown in Fig. 4, the other arm 33 and its finger 37 are moved into a projected position in which the cam 40 of the finger 37 contacts the steering column. The cams 40 of the fingers, upon engaging the steering column, will cause the fingers to swing to a limited extent about their pivots 38.

Suitable means are provided for normally holding the fingers on the arms 32 and 33 in such positions with relation to the steering column that when the arms are moved toward the steering column the outer ends of the fingers will be deflected by engagement with the steering column. In the particular construction shown by way of example, the fingers and their cams, when in their inoperative positions, extend approximately parallel with the arms 32 and 33. To hold the fingers in these inoperative positions, the fingers are provided with downwardly extending stop projections 44 which extend downwardly through a hole or opening 45 formed in the base 16, and a spring 46 is connected to the downwardly extending projections 44. This spring acts on the fingers in a direction to urge them to swing about their pivots 38 into their inoperative positions, and when in these positions the projections 44 will engage the edge of the aperture 45 in the base plate. The arms 32 and 33 are also recessed at their adjacent edges as shown at 47, to provide spaces through which the projections 44 of the fingers may extend downwardly. Consequently, when the handle 24 is in intermediate position, the two fingers 36, 37 will occupy positions substantially parallel with each other, as shown in Fig. 2.

The cams 40 are normally held in positions substantially in alinement with the body portions of the fingers 36 and 37 by means of springs 43, the ends of which are attached to outwardly extending projections on the cams and fingers. The body portions of the fingers also have upwardly extending integral stop projections 48 which are engaged by the cams when the cams are substantially in alinement with the body portions of the fingers. The springs 43, consequently, swing the cams into positions to engage the stops 48. The cams 40 form in effect pivoted or pointed extensions of the fingers, and are free to swing in one direction against the action of the springs, being held against swinging in the other direction by the stops 48.

The outer ends of the cam members preferably terminate in a pair of convexly curved projections which meet to form a recess or niche 49. One of the curved projections forms a relatively sharp end or toe 52, the purpose of which will be hereinafter described.

The outer ends of the cams 40 of the fingers 36 and 37, when in their projected positions, may be engaged by means of a downwardly extending part 50 suitably mounted on the steering wheel 11. This part 50 is arranged to extend into close proximity to the outer periphery of the steering column 9 at the portions thereof which may be engaged by the cams of the fingers, and may be secured to the steering wheel 11 in any suitable manner. For example, the part 50 may be formed integral with a ring 51 suitably secured to the steering wheel, and this part 50 will, during the turning of the steering wheel 11, engage either of the cams 40 of the fingers 36 or 37, which may be in contact with the steering column. When the handle 24 is moved into the position shown in Fig. 3, to indicate that it is intended to make a right turn, then during the right turn the steering wheel will be turned in the direction indicated by the arrow in Fig. 3. Consequently, when the part 50 of the steering wheel contacts the toe 52 of the cam of the finger 36, which is in contact with the steering column, the cam cannot be swung about its pivot because of the stop 48 and consequently, the finger is merely swung about its pivot 38 against the action of the spring 46. Consequently, the signal for a right-hand turn will continue without interruption during the making of the right-hand turn. However, as soon as the turn is completed and the steering wheel swung in the opposite direction to enable the vehicle to resume a straight course, the part 50 will move into engagement with the niche of the cam of the finger 36 in a counter-clockwise direction, opposite to that indicated by the arrow in Fig. 3, and this engagement of the part 50 with the cam on the finger 36 will result in pushing this finger and the arm 32 connected therewith to the left in Fig. 3. As this arm is thus moved back into inoperative or retracted position, the inclined face or flange 42 of this arm will engage the projection or thimble 30 of the handle and thus force the handle back into the intermediate or open-circuit position, shown in Fig. 1, which, in turn, causes the circuit for the right-hand turning signal to be broken, thus cancelling the signal.

When the signal device is actuated for a left-hand turn, the handle 24 will be turned into the position shown in Fig. 4, with the result that the cam 40 of the finger 37 will be moved into engagement with the steering column, so that the arm will be cammed into an inclined position by this engagement, as shown in Fig. 4. Consequently, when the steering wheel is turned in a counter-clockwise direction, to make a left turn, the part 50 engaging the toe of the cam 40 of the finger 37 will merely cause the finger to swing about its pivot 38, and after the part 50 has passed, the spring 46 will move the finger and cam 40 back into engagement with the steering column. However, when the turn has been completed and the steering wheel is rotated in a clockwise direction, indicated by the arrow in Fig. 4, to cause the vehicle to again resume a straight course, the part 50 will be moved into engagement with the niche in the cam 40 and thus force this cam and its finger and the arm 33 to which the finger is connected to move to the left in Fig. 4, so that the inclined end of the arm 33 will move the handle 24 back into intermediate position, thus cancelling the left-hand turning signal.

In the operations described in connection with Figs. 3 and 4, it is assumed that the handle 24 of the signal actuating device is released by the operator after it has been moved toward one side or the other of its neutral or open circuit position to indicate the direction of the turn to be made. However, it sometimes happens that the operator forgets to release the handle 24 after the turn has been made. If this happens, the pivoted cams 40 forming the ends of the fingers will act to prevent damage to the mechanism. For example, as shown in Fig. 8, the signal has been actuated according to Fig. 4, for a left turn and the handle 24 is being held by the operator while the steering wheel is turned in a clockwise direction to straighten out the vehicle after the turn has been made, then the part 50 of the steering wheel will engage in the niche 49 of the cam member 40, and since the finger 37 is prevented from moving backwardly to the left in Fig. 8, because of the fact that the handle 24 is being held, the cam member 40 of the finger will swing about its pivot 41 as shown in Fig. 8, and thus permit the part 50 of the steering wheel to move past the cam member without cancelling the signal and without placing any severe strains on the parts of the signal actuating mechanism. During the normal operation of cancelling the signal, the spring 43 is of sufficient strength to hold the cam member 40 straight outwardly from the body portion of its finger with sufficient force to enable the arm 32 or 33 to be moved back and move the handle 24 into its intermediate or open circuit position. However, if the handle is being held against such movement the spring 43 will yield and permit the cam member 40 to swing as described to prevent damage to the mechanism.

It will be noted that the outer end of the cam is so formed that the outer curved portion, which is engaged by the part 50 of the steering wheel for cancelling the signal, is so curved toward the niche that it guides the part 50 into engagement with the niche, and also when the cam 40 swings on its pivot 41, the part 50 will roll on the curved end, thus facilitating the operation of the mechanism.

It is generally desirable to provide a pilot light on a signal-actuating device of this type to indicate to the driver when either circuit is completed and, if desired, a light of this type may be provided including a light bulb 54 and a socket 55 therefor. The socket may be suitably secured to the base 16 and the light bulb 54 may extend through another opening in the base 16 and the inner or adjacent faces of the arms 32 and 33 may be recessed as indicated at 56, these recesses being of sufficient length so that the arms 32 and 33 will clear the light bulb 55 during their movement lengthwise of the base 16.

The spring 46, which yieldingly urges the fingers 36 and 37 into positions to cooperate with the steering column, may be in the form of a coil spring extending about the lamp socket 55, Fig. 5, with its ends thereof fastened to the downwardly projecting parts 44. This spring serves the additional purpose of yieldingly holding the arms and fingers in retracted positions in which the fingers are sufficiently remote from the steering column so as not to be engageable by the part 50 of the steering wheel. When the arms and fingers are in their projected positions, they will be yieldingly held in such positions by the handle 24, which, in turn, is held by the spring-pressed detent or member 31 yieldingly seated in a depression 29.

The construction provided is efficient and reliable in operation. The detent construction shown, in which a spring pressed member enters the depression 29, is such that it is unnecessary for the arms 32 and 33 to move the handle 24 entirely into its intermediate position, since if the handle is swung into proximity to its intermediate position, the detents will cause the handle to complete its movement into intermediate or open circuit position. The construction furthermore has the advantage that if the mechanism for cancelling the signals should, for any reason, become inoperative, the signals can be cancelled by returning the handle 24 by hand to its intermediate position.

It will be understood that various changes in the details and arrangements of parts, which have been herein described and illustrated in order to explain the nature of the invention, may be made by those skilled in the art within the principle and scope of the invention as expressed in the appended claims.

I claim as my invention:

1. A self-cancelling direction indicating signal device for vehicles having a steering column and a rotary steering wheel, said mechanism including a multiple position switch having a movable contact member movable into two circuit-closing positions and into an intermediate open circuit position, a housing enclosing said switch, a handle connected with said movable contact member of the switch and yieldingly held in either of said circuit-closing positions and in said open-circuit position, means for yieldingly holding said handle in any of said positions, a base mountable on said steering column and on which said switch housing is mounted, a pair of arms slidably mounted on said base, each of said arms having a finger pivoted on one end thereof, a part on said handle mounted to engage the other ends of said arms for moving either of said arms into a projected position in which the finger of said arm engages the steering column, and a part on the steering wheel engageable with either of said fingers when a finger is in projected position, for moving either of said fingers and the arm on which it is mounted into retracted position, said arms when moving into said retracted positions engaging said part on said handle for moving said handle and said movable contact member of said switch into open-circuit position.

2. A device according to claim 1, in which said movable contact member of the switch is mounted on an oscillatory shaft and in which said handle is mounted on said shaft to turn in opposite directions from an intermediate open-circuit position into circuit-closing positions, and in which said arms are provided with inclined faces engaging a part on said handle to move said handle from a circuit-closing position into said intermediate position when an arm is moved into retracted position.

3. A device according to claim 1, in which said arms are slidably mounted on said base in substantially parallel relation to each other and in which said handle is mounted to swing relatively to said base and in which the ends of said arms adjacent said handle are provided with inclined faces which contact with a part of said handle, one of said arms being moved into projected position when said handle is swung in one direction and the other arm being swung into projected position when the handle is swung in the other direction, said inclined end portions engaging said handle to return the same into open-circuit position by a wedging action when said arms are returned from projected into retracted positions.

4. A device according to claim 1, in which said arms are slidable on said base into projected and retracted positions and in which said base is provided with lugs struck out therefrom for guiding said arms in their movement and in which pivot pins are provided connecting said arms and said fingers, said base having guide slots through which said pivot pins extend to guide said arms in their movements.

5. A device according to claim 1, and including yielding means urging said arms into retracted positions.

6. A self-cancelling direction indicating signal device for vehicles having a steering column and a rotary steering wheel, said mechanism including a base mountable on said steering column, a switch actuating handle pivotally mounted on said base and movable about its pivot into either of two opposite positions to close either of two circuits and into an intermediate open-circuit position, a pair of arms slidably mounted on said base in parallel relation to each other, a part on said handle which engages one of said arms when said handle is swung in one direction from its open-circuit position, to slide said one arm into projected position, said part on said handle engaging said other arm when said handle is swung in the other direction from its open-circuit position, to slide said other arm into projected position, each of said arms having a finger pivoted thereon which is moved into engagement with said steering column when its arm is slid into projected position, and a part on said steering wheel extending into a position to contact either finger engaging said steering column, said part of said steering wheel, when said wheel is turned in one direction, moving one of said fingers and the arm connected therewith into retracted position, and when turned in the other direction moving the other finger and its arm into retracted position, said arms having inclined ends movable into engagement with said part of said handle when moving into retracted positions to cam said handle into said intermediate position, said inclined ends also being engaged by said part of said handle for moving said arms into projected positions.

7. A self-cancelling direction indicating signal device for vehicles having a steering column and a rotary steering wheel, said mechanism including a switch actuating handle movable into either of two opposite positions to close either of two circuits and into an intermediate open-circuit position, a pair of movable arms, one of which is engaged and moved into a projected position by said handle when said handle is moved in one direction from its open-circuit position, and the other of which is engaged by said handle when moved in the other direction from its open-circuit position, a finger pivoted on each of said arms, each finger being made of two parts pivotally connected, a spring for normally holding said two parts of each finger substantially in alinement, each finger engaging said steering post when the arm to which it is pivoted is in projected position, and a part on said steering wheel extending in position to engage a finger engaging said steering column for moving the arm to which such finger is pivoted from a projected position to a retracted position and for thereby moving said handle into open circuit position, the two parts of said finger swinging relatively to each other to permit said part of said steering wheel to pass said finger when said handle and arm are held against movement.

8. A self-cancelling direction indicating signal device for vehicles having a steering column and a rotary steering wheel, said mechanism including a switch actuating handle movable into either of two opposite positions to close either of two circuits and into an intermediate open-circuit position, a pair of movable arms, one of which is engaged and moved into a projected position by said handle when said handle is moved in one direction from its open-circuit position, and the other of which is engaged by said handle when moved in the other direction from its open-circuit position, a finger pivoted on each of said arms, each finger including a body portion pivoted on one end on an arm and having a cam pivoted on the other end thereof, said fingers being moved by said arms into projected positions in which said cams engage said steering column and into retracted positions in which said cams are in spaced relation to said steering column, and a part on said steering wheel extending into position to engage said cams when in projected positions to move the same and said arms into retracted positions, said arms engaging said handle to move the same into open circuit position when said arms are moved by said part of said steering wheel into retracted position.

9. A signal device according to claim 8 and including springs for holding said cams in substantial alinement with said body portions of said fingers, said cams being movable about their pivoted connections with said body portions of said fingers when said arms are held against movement into retracted position, to permit said part of said steering wheel to pass said cam.

10. A signal device according to claim 8 and including springs for holding said cams in substantial alinement with said body portions of said fingers, said cams being movable about their pivoted connections with said body portions of said fingers when said arms are held against movement into retracted position, to permit said part of said steering wheel to pass said cam, and stops to limit the swinging of said cams in one direction, said springs urging said cams against said stops.

11. A self-cancelling direction indicating signal device for vehicles having a steering column and a rotary steering wheel, said mechanism including a switch actuating handle movable into either of two opposite positions to close either of two circuits and into an intermediate open-circuit position, a pair of movable arms, one of which is engaged and moved into a projected position by said handle when said handle is moved in one direction from its open-circuit position, and the other of which is engaged by said handle when moved in the other direction from its open-circuit position, a finger pivoted on each of said arms, each finger being made of two parts pivotally connected, a spring for normally holding said two parts of each finger substantially in alinement, each finger engaging said steering post when the arm to which it is pivoted is in projected position, and a part of said steering wheel extending in position to engage a finger engaging said steering column for moving the arm to which such finger is pivoted from a projected position to a retracted position and for thereby moving said handle into open circuit position, the two parts of said finger swinging relatively to each other to permit said part of said steering wheel to pass said finger when said handle and arm are held against movement, the outer end portion of the finger part which engages said steering column being provided with an inwardly extending niche positioned to receive said part of said steering wheel when the same is turned in a direction to cancel a signal.

12. A signal device according to claim 11, in which said outer end portion of the finger part has convexly curved edges terminating at said niche to provide a rolling surface engaging said part of said steering wheel.

13. A self-cancelling direction indicating signal device for vehicles having a steering column and a rotary steering wheel, said mechanism including a base mountable on said steering column, a multiple position switch having a housing secured to said base and including a shaft turnable in opposite directions to complete direction indicating circuits and into an intermediate open circuit postion, a handle secured on said shaft for turning the same, a detent on said handle cooperating with said base for yieldingly holding said handle in an intermediate open circuit position and in positions at either side of said open circut position, a pair of arms slidably mounted on said base, a part on said handle movable into engagement with either of said arms for sliding the same into their projected positions, a finger pivoted on each of said arms and movable into proximity to said steering post when the arm on which it is pivoted is in projected position, a part on said steering wheel extending into a position to engage a finger when in proximity to said steering post for moving the arm to which said finger is pivoted from a projected position into a retracted position, and yielding means acting on said arms for urging the same into retracted positions into engagement with said part on said handle.

FREDERICK F. STUBE.

REFERENCES CITED

The following references are of record in the file of this patent:

UNITED STATES PATENTS

| Number | Name | Date |
|---|---|---|
| 1,584,761 | Fischer | May 18, 1926 |
| 1,748,439 | Bugh | Feb. 25, 1930 |
| 2,069,936 | Becmer | Feb. 9, 1937 |
| 2,264,225 | Thirlwell | Nov. 25, 1941 |
| 2,276,413 | Moore | Mar. 17, 1942 |
| 2,427,595 | Fuller | Sept. 16, 1947 |